(12) United States Patent
Korchev et al.

(10) Patent No.: US 8,006,316 B2
(45) Date of Patent: Aug. 23, 2011

(54) SCANNING ION CONDUCTANCE MICROSCOPY FOR THE INVESTIGATION OF LIVING CELLS

(75) Inventors: Yuri Evgenievich Korchev, London (GB); Max Joseph Lab, London (GB); Daniel Paulo Sànchez-Herrera, London (GB)

(73) Assignee: Ionscope Ltd, London (GB)

( * ) Notice: Subject to any disclaimer, the term of this patent is extended or adjusted under 35 U.S.C. 154(b) by 270 days.

(21) Appl. No.: 12/375,870

(22) PCT Filed: Aug. 1, 2007

(86) PCT No.: PCT/GB2007/002924
§ 371 (c)(1),
(2), (4) Date: May 22, 2009

(87) PCT Pub. No.: WO2008/015428
PCT Pub. Date: Feb. 7, 2008

(65) Prior Publication Data
US 2009/0260114 A1    Oct. 15, 2009

(30) Foreign Application Priority Data
Aug. 1, 2006 (GB) .................................. 0615277.1

(51) Int. Cl.
*G01N 37/00* (2006.01)
*H01L 21/306* (2006.01)
(52) U.S. Cl. ......... 850/58; 250/428; 422/68.1; 422/501; 422/502; 73/104; 73/105; 435/4
(58) Field of Classification Search .................... 850/58, 850/43, 45, 33, 40; 250/306, 309, 311, 428–430; 422/68.1, 50, 82.01, 82.02, 501, 502; 435/4, 435/6, 7.1, 7.2; 73/104, 105
See application file for complete search history.

(56) References Cited

U.S. PATENT DOCUMENTS

| | | | |
|---|---|---|---|
| 7,596,990 B2 * | 10/2009 | Su et al. | ........................... 73/105 |
| 2006/0000263 A1 * | 1/2006 | Su et al. | ........................... 73/105 |
| 2009/0222958 A1 * | 9/2009 | Su et al. | ........................... 850/33 |

FOREIGN PATENT DOCUMENTS

| | | |
|---|---|---|
| JP | 09251979 | 9/1997 |
| WO | WO 00/63736 A2 | 10/2000 |
| WO | WO 02/102504 A2 | 12/2002 |
| WO | WO 2004/023490 A2 | 3/2004 |

OTHER PUBLICATIONS

Klenerman, D. et al. "Potential biomedical applications of the scanned nanopipette" *Nanomedicine*, 2006, pp. 107-114, vol. 1, No. 1.
Korchev, Y.E. et al. "Scanning Ion Conductance Microscopy of Living Cells" *Biophysical Journal*, Aug. 1997, pp. 653-658, vol. 73.
McCarter, G.C. et al. "Mechanical transduction by rat dorsal root ganglion neurons in vitro" *Neuroscience Letters*, 1999, pp. 179-182, vol. 273.
Sánchez, D. et al. "Localized and non-contact mechanical stimulation of dorsal root ganglion sensory neurons using scanning ion conductance microscopy" *Journal of Neuroscience Methods*, 2007, pp. 26-34, vol. 159.

* cited by examiner

*Primary Examiner* — Bernard E Souw
(74) *Attorney, Agent, or Firm* — Saliwanchik, Lloyd & Eisenschenk

(57) ABSTRACT

A method for interrogating a surface using scanning probe microscopy comprises bringing a scanning probe into proximity with the surface and controlling the position of the probe relative to the surface to maintain a constant distance, characterized in that pressure is applied to the surface by a regulated flow of liquid through the probe, with subsequent monitoring of the position of the probe, wherein movement of the probe indicates a consequent movement of the surface.

15 Claims, 7 Drawing Sheets

SCANNING ION CONDUCTANCE MICROSCOPY FOR THE INVESTIGATION OF LIVING CELLS

CROSS-REFERENCE TO RELATED APPLICATION

This application is the National Stage of International Application Number PCT/GB2007/002924, filed Aug. 1, 2007, which is hereby incorporated by reference herein in its entirety, including any figures, tables, nucleic acid sequences, amino acid sequences, or drawings.

FIELD OF THE INVENTION

This invention relates to scanning probe microscopy and its use in the study of the flexibility or elasticity of a structure, in particular cells.

BACKGROUND OF THE INVENTION

The cell is the most fundamental unit of living organisms, whether animal or plant. The study of its structure and composition, and how its various constituents function, lends valuable insight into the complex processes that occur in integrated biological systems. This requires techniques that allow investigation of cell samples to be conducted in real-time, non-invasively, and in solutions that mimic physiological conditions so that cell functionality is retained.

Optical microscopy (using visible light) has been applied widely to study live cells. However, the resolution is limited by diffraction to about 200-250 nm. For more detailed study, one commonly used method is electron microscopy, where it is possible to obtain images with 10 nm resolution, but the sample needs to be fixed prior to imaging. Hence, it is not possible to use an electron microscope to study living cells.

Another possible high resolution technique is based on the use of scanning probe microscopy (SPM), in which a sharp probe tip is scanned in close proximity to the sample under study. The consequent interactions and thus the chemical/physical properties of the sample can be plotted as a function of the tip's position with respect to the sample, to generate a profile of this measured interaction. Members of the SPM family that are commonly applied to biological imaging are atomic force microscopy (AFM), scanning ion-conductance microscopy (SICM) and scanning near-field optical microscopy (SNOM).

In SICM, an electrolyte-filled, glass micropipette is scanned over the surface of a sample bathed in an electrolytic solution; see Hansma et al (1989) Science 243:641-3. The pipette-sample separation is maintained at a constant value by monitoring the ion-current that flows via the pipette aperture. The flow is between two electrodes: one inside the pipette and another outside in the electrolyte solution. For an applied bias between the electrodes, the ion-current signal depends on a combination of the micropipette's resistance ($R_P$) and the access resistance ($R_{AC}$) which is the resistance along the convergent paths from the bath to the micropipette opening. $R_P$ depends on the tip diameter and cone angle of the micropipette, whereas $R_{AC}$ displays complicated dependence on the sample's electrochemical properties of the bath and the sample, geometry and separation from the probe. It is $R_{AC}$ that lends ion-current sensitivity to the pipette-sample separation and allows its exploitation in maintaining the distance such that contact does not occur.

The optimum tip-sample separation that has allowed SICM to be established as a non-contact profiling method for elaborated surfaces, is approximately one-half of the tip diameter; see Korchev et al (1997), J. Microsc. 188:17-23, and also Biophys. J. 73:653-8. The outputs of the system controlling the position of the tip are used to generate images of topographic features on the sample surface. The spatial resolution achievable using SICM is dependent on the size of the tip aperture, and is typically between 50 nm and 1.5 µm. This produces a corresponding resolution.

However, there is still a need for improved methods and apparatus to study surface structures, e.g. cells.

SUMMARY OF THE INVENTION

The present invention is based on the realisation that a localised and controlled pressure or force can be applied to a surface by means of a regulated flow of liquid through a scanning probe located in proximity to the surface under study. The application of this pressure can be used to measure the flexibility or elasticity of the surface by monitoring the relationship between the applied pressure and the resulting movement of the surface. It can also be used to stimulate cell surface components, eg. mechanosensitive ion channels, with subsequent measurement of this stimulation carried out by monitoring consequent changes in electrophysiological or chemical signals.

According to a first aspect of the present invention, a method for interrogating a surface using scanning probe microscopy, comprises bringing a scanning probe into proximity with the surface and controlling the position of the probe to maintain a constant distance, characterised in that pressure is applied to the surface by a regulated flow of liquid through the probe, with subsequent monitoring of the position of the probe, wherein movement of the probe indicates a consequent movement of the surface.

According to a second aspect of the present invention, a method for inducing an electrophysiological or chemical change in a cell, comprises bringing a scanning probe into proximity with the cell surface and applying a defined pressure to the surface by means of a regulated flow of liquid through the probe, and monitoring the cell for changes in electrophysiological or chemical signals.

According to a third aspect of the present invention there is an apparatus for interrogating a surface, comprising a scanning probe microscope and a means for applying pressure to the surface by a regulated flow of liquid through the probe.

Since the mean distance of the probe tip from the surface is typically approximate to the internal radius of the probe, the flow pattern at low rates of flow generates a pressure at the surface that is similar to the hydrostatic pressure applied to the liquid inside the probe and the net force normal to the surface is the product of that pressure and the cross-sectional area of the aperture at the probe tip. The local pressure felt by the surface under the tip is almost exactly the same as the pressure applied externally to the pipette (probe) via whatever means are used to generate it. In addition, the force applied to the surface turns out to be very close to that pressure multiplied by the cross-sectional area of the tip. Both of these aspects have been determined empirically and explored analytically. They make the interpretation of data very straightforward, and are particular strengths of the method of the invention.

DESCRIPTION OF THE DRAWINGS

The invention is described with reference to the accompanying figures, wherein.

DESCRIPTION OF THE INVENTION

Figure 1:
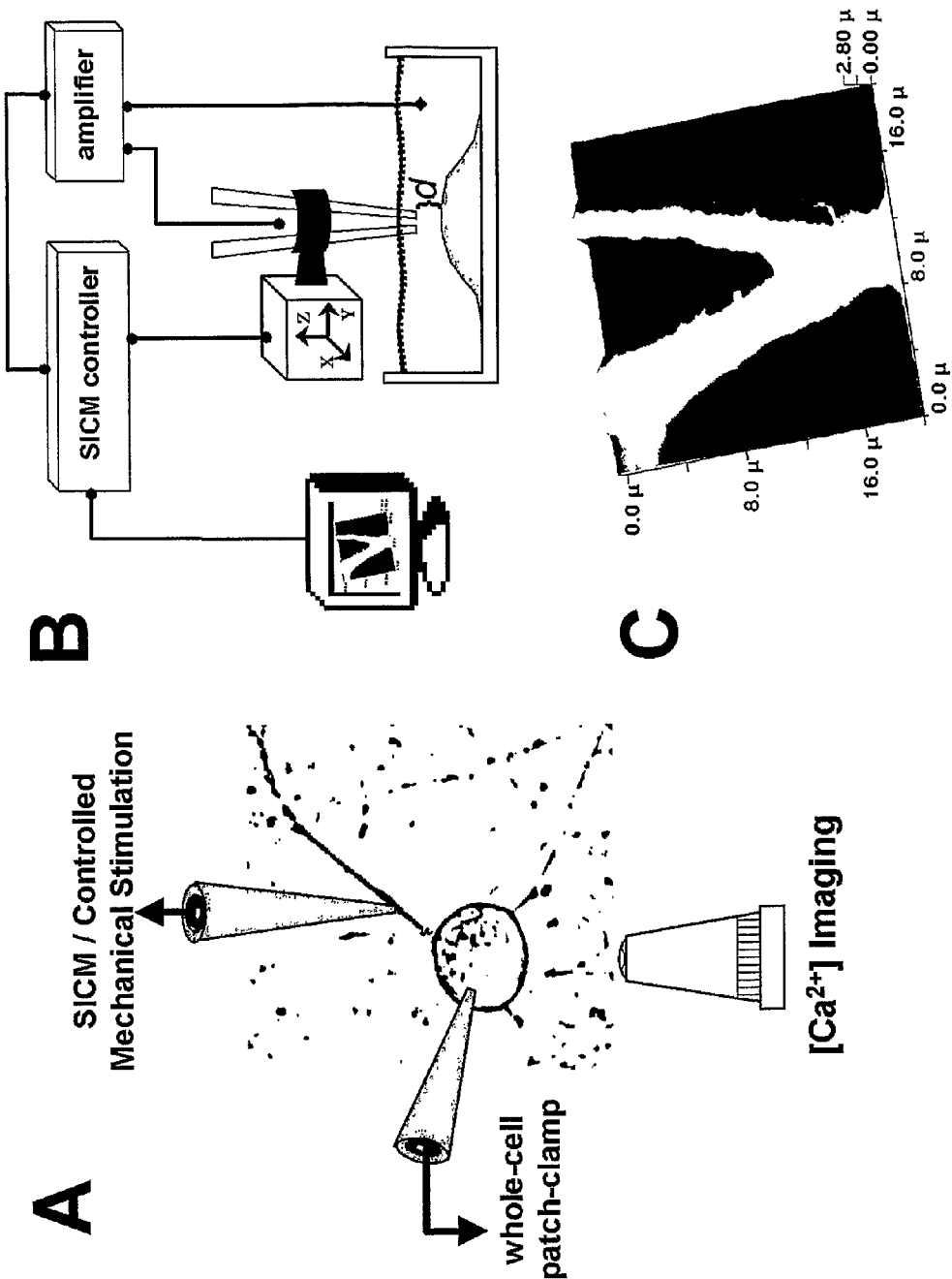
FIGS. 1(A) and (B) show the configuration of a SICM system used to investigate a cell surface and FIG. 1(C) shows a resulting scan of the cell surface.

The present invention provides a means for applying a highly localised and controlled pressure or force to a surface. This may be used to measure the elasticity of a cell surface or to stimulate various biological structures which generate electrophysiological or chemical signals in response to the mechanical stimulation.

Apparatus for carrying out the invention will usually comprise a probe, means for measuring and/or controlling the distance of the probe from the surface to be interrogated and means for applying controlled pressure to a liquid inside the probe. The applied pressure produces a flow of liquid through the probe tip and in turn generates a related pressure at the interrogated surface.

The term 'interrogate' is intended to refer to the ability to monitor changes at the surface of a structure, e.g. to detect structural changes on or at the surface at a single position or as the probe scans the surface.

The pressure applied to the surface will, if the surface is sufficiently pliable, cause the surface to move. Positive pressure, ie. flow through the probe towards the surface, has the effect of pushing the surface away from the probe, increasing the separation between the surface and probe. A negative pressure draws the surface towards the probe, decreasing the separation. However, as it is intended that the apparatus will constantly control the distance of the probe from the surface, any movement of the surface is followed by a corresponding movement of the probe. As a result of this, the inter-relationship between the liquid flow, pressure and movement can be monitored. Any change in the vertical position of the probe provides a direct indication of changes in the vertical position of the surface that might result from the applied pressure. The relationship between the applied pressure and the resulting movement of the surface can therefore provide information on the elasticity of the surface structure.

The invention can also be used to stimulate cellular structures which emit electrophysiological or chemical signals in response to mechanical stimulation. For example, ion channels can be stimulated, and the resulting emitted signal can be detected using a suitable detector. This is useful in the study of mechanical sensation. Mechanical sensation is essential for the operation of different bodily processes, including osmoregulation, growth, hearing, gravitropism, balance, proprioception and touch (Ghazi et al., Biochemie, 1998; 80:357-62). Unlike the senses of smell, taste and vision, which all act via the activation of G-protein-coupled receptors, the molecular bases of mechanosensation underlying touch, pain and hearing remain unclear (Sukharev and Corey, Sci STKE, 2004; 219:re4; Kung, J. Appl. Physiol., 2005; 98:2328-36). The mechanosensitive (MS) ion channels consist of transmembrane proteins that transduce mechanical force into electrical or chemical signals (Sukharev and Corey, supra 2004). MS ion channels have been detected electrophysiologically in a great variety of organisms, including bacteria, yeast, plants and a great number of animal cells (Ghazi et al, supra 1998; Kung, supra 2005). The mechanically activated channels appear to be a heterogeneous group of membrane proteins from a variety of ion channel families, including MscL and MscS of *Escherichia coli*, the stretch-activated K+ channels (of 6 transmembrane domains (TM) (SAKCa) and 2TM (KATP)), the DEG/ENaC type channels, the mechano-gated two-pore (4TM) K+ leakage channels and several members of the TRP family (Ghazi et al, supra 1998; Sukharev and Corey, supra 2004).

The present invention is useful not only for interrogating a cell or cell surface structure, but may be applied in the study of any surface which is deformable by the application of the appropriate levels of pressure applied by the scanning microscope, or which provides different levels of resistance to such pressure. The surface may be a solid or a liquid. For example, the surface may be that of an emulsion or water-based liquid, where the mechanical characteristics of the surface reveal properties of the emulsion or liquid. For example, oil droplets in a water-based liquid will provide different levels of resistance to the applied pressure, compared to the water, and therefore the invention can be used to identify the characteristics of the oil-in-water composition. This aspect may be of use to determine the bulk characteristics of many foodstuffs, cosmetics and cleaning products. The liquid water under study will usually be immiscible in the liquid used to fill the probe.

In addition, the invention can be used to study non-biological structures for example, rubber-based or plastics-based materials, where the applied pressure can reveal differences in the structure of such materials.

The probe can also be used to scan a surface, ie. by scanning probe microscopy. An image can be generated, and a part of the surface that is of interest can be identified as having a particular characteristic. Positive or negative pressure can be applied to the surface, very precisely, at a selected location, thereby allowing measurement of the mechanical response or movement of the surface. This process may be repeated, on the same or different parts of the surface, to provide detailed information on the surface.

The probe may also be used to scan the surface while simultaneously applying pressure to it. In this way, the invention can be used to build up a detailed picture of the surface as it responds to the applied pressure, to reveal surface and sub-surface structures.

In areas where the surface is very flexible and the pressure applied is positive, the surface may collapse onto the underlying substructure as, for example, the cell membrane may reveal the shape of the cytoskeleton below. In areas where the surface is very flexible and the pressure applied is negative, variation in the extent of lift to the surface may reveal, for instance, which parts of the cell membrane are anchored to the cytoskeleton and which are free to move.

An advantage of the present invention is that the surface can be interrogated without bringing the probe into contact with the surface, which can result in damage to the surface, contamination of the tip and cross-contamination of the surface in repeat experiments.

The invention can be carried out using conventional apparatus. For example scanning ion conductance microscopy (SICM) can be used. A typical SICM system comprises components that feature in all scanning probe microscopes, namely, scanning probe, piezo-actuator scanning elements, control electronics and a computer. These components may be built in and around an inverted microscope, eg. Diaphot 200 (Nikon Corporation, Tokyo, Japan).

Any suitable hollow probe may be used. Typically, the probe is a micropipette or nanopipette. Such probes can be fabricated by pulling borosiliate glass capilliaries with, for example, outer and inner diameters of 1.00 mm and 0.58 mm respectively, using a laser-based micropipette puller (for example model P-2000, Sutter Instrument Co., San Rafael, Calif., USA). Probes with conical taper lengths and apex diameters of 200 nm, 400 nm and 1.0 µM, can be achieved. The apparatus will typically be set up so that the mean distance of the probe tip from the surface is approximately the internal radius of the probe.

The pressure can be exerted by conventional means to control the flow of liquid through the probe. Typically, a programmable pressure injector system, for example model PM-4, Warner Instruments, Hamden, Conn., USA, is coupled to the shank of the SICM pipette holder by means of a flexible tube, and the injector programmed to generate the required pressure/time profile. The amount of pressure required can be determined by the skilled person. Typically, a positive pressure of at least 10 kPa, e.g. from 10 to 50 kPa is applied. More typically a pressure of from 13 to 40 kPa is applied.

The invention can also be carried out with means to measure electrophysiological or chemical signals which may be generated by a cell or biological surface and stimulated using the invention. Such measurement means is conventional in scanning ion conductance microscopy and can be applied to the present invention.

The following example illustrates the invention.

Example

The following example investigated the non-contact SICM method of the invention in comparison to a conventional contact SICM method, in the study of human and rat DRG sensory neurons.

Scanning Ion Conductance Microscope (SICM)

We used the SICM probe to select sub-micron areas of membrane, normally inaccessible for larger probes used for mechanical stimulation, and mechanically stimulate them. We obtained topographic images and mechanically stimulated the cells using an SICM (Ionoscope Limited, London, UK). The basic arrangement of the SICM for topographical imaging of living cells has been described previously (Korchev et al., Biophys. J. 1997a; 73:653-8; Korchev et al., J. Microsc. 1997b 188 (Pt 1): 17-23). Briefly, the SICM uses a patch-clamp nanopipette arranged perpendicularly to the sample as a scanning probe. The pipette, mounted on a three-axis piezo translation stage, approaches the cell surface and scans over it while maintaining a constant tip-sample separation distance (FIG. 1B), using the SICM feedback control that keeps the ion current through the pipette constant. The SICM controller produces a surface image of the cell (FIG. 1C), and makes possible a straightforward pipette approach precisely over an identified specific area or structure of the cell, to within approximately 100 nm from the membrane. The SICM pipette-probe can then be used to mechanically stimulate the cell with simultaneous patch-clamp electrophysiology, to measure membrane currents or intracellular $Ca^{2+}$ imaging (FIG. 1A).

The SICM nanopipettes were pulled from borosilicate glass capillaries (Intrafil, 1.0 mm OD×0.58 mm ID; Intracel Ltd, Herts, UK), using a laser-based electrode puller (P-2000, Sutter Instrument, Novato, Calif.), to achieve a pipette resistance of 15-20 MΩ when submerged in the bath solution. The pipette tip internal radius, based on the resistance of the pipette when it was submerged in the bath solution, was approximately 200 nm.

Mechanical Stimulation

Figure 2:
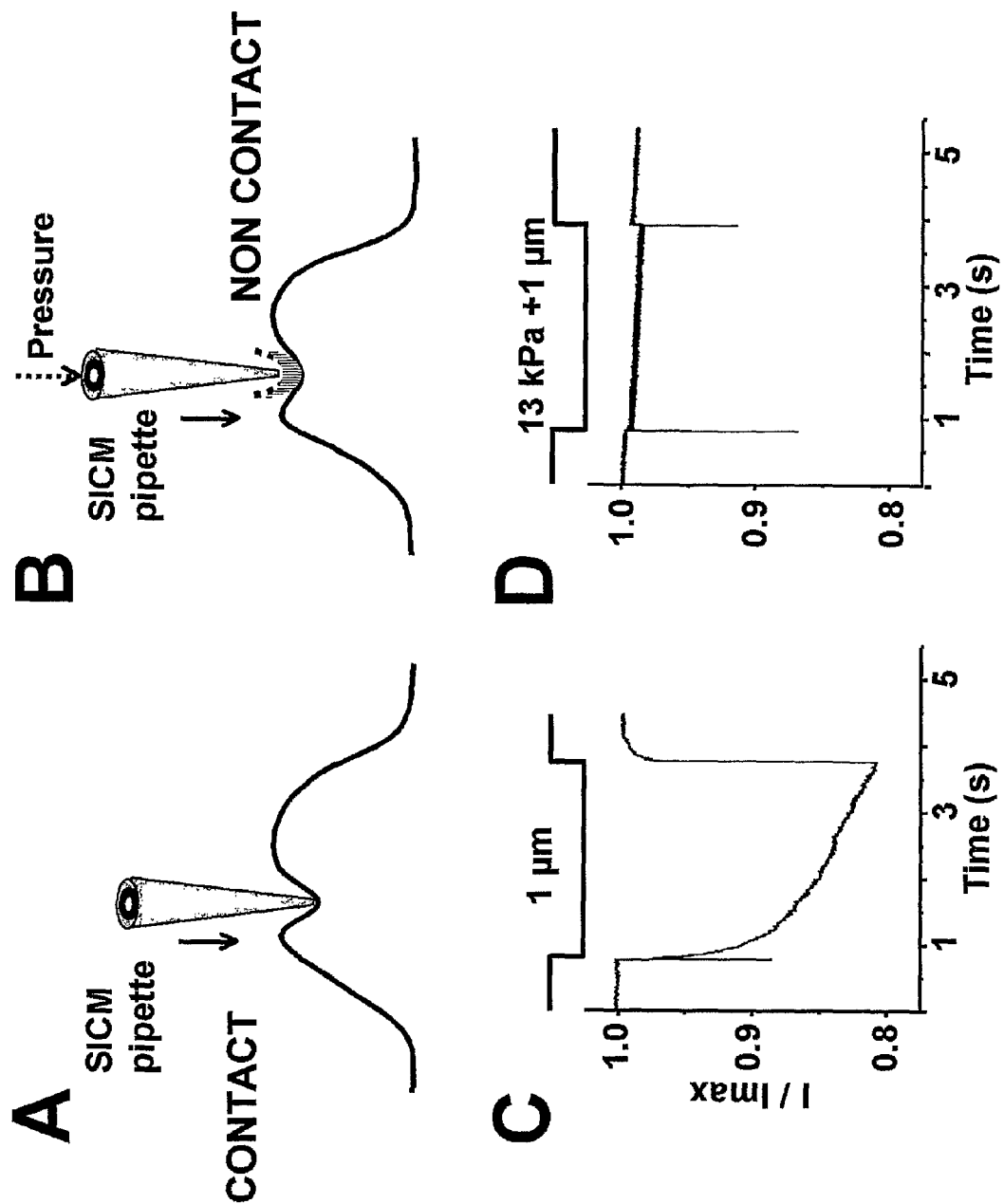
FIG. 2 illustrates SICM with both a contact and non-contact approach.

We applied two different types of mechanical stimuli using the nanopipette probe of the SICM. In the first approach, the "contact method", the SICM feedback control was switched off and the pipette was vertically lowered against the cell membrane by piezo control in steps of determined distance and duration (FIG. 2A). In this method the pipette physically touched and depressed the membrane over a small area (~700 nm=external diameter of the pipette tip), producing a reduction in the current that flowed through the pipette (I/Imax) due to the physical blockage of the pipette (FIG. 2C). The second approach is a "non-contact method", where the pipette was vertically lowered towards the cell membrane by piezo control at the same time as the application of a pressure jet from the tip of the pipette against the cell (FIG. 2B). Positive pressure (13 to 40 kPa) was applied via the shank of the SICM pipette to produce a jet of liquid out of the tip of the pipette a few seconds before the application of the downward stimulating steps and was stopped immediately afterwards. The solution jet prevented contact with the membrane and hence blockage of the pipette, which was confirmed by the absence of significant reduction of current flow through the pipette (FIG. 2D). This method produces a "non-contact" mechanical stimulation of the cell because it prevents any contact and physical damage to the cell membrane.

We addressed the issue of mechanically induced artefacts with experiments applying pressure jets against the bottom glass surface of the recording chamber to see if there was spurious motion of the pipette when we apply the pressure jet which may be caused pipette movement or change in pipette resistance but found no significant motion of the SICM pipette (<10 nm).

Cell Culture

Human DRG sensory neurons were prepared as described in Anand et al., Neurosci. Lett. 2006; 399:51-56. Briefly, whole cervical DRGs were obtained from five male adult patients (n=5, age range 21 to 28 years), with brachial plexus avulsion i.e. central axotomy, up to two weeks previously, during traffic accidents. The DRG were excised during the course of nerve reconstructive surgery as a necessary part of nerve repair, and studied with patients' informed written consent and regional ethical committee approval. Two to three cervical ganglia from each patient were finely cut, and enzyme digested in Ham's F12 nutrient medium (GIBCO), containing penicillin (100 µg/ml), streptomycin (100 µg/ml), 0.5% dispase (8 U/mg, GIBCO), and 0.2% collagenase (Type IV Worthington, 168 U/mg), for 3 hours at 37° C., followed by mechanical dissociation in Ham's F12+10% fetal calf serum. 250 µl of the cell suspension containing approximately 3000 cells/ml was plated on poly-l-lysine (20 µg/ml, Sigma), and laminin (20 µg/ml, Sigma), coated 8 well Permanox Labtek slides (Nalge Nunc Int.). 2 ml Ham's F12+ 10% FCS, was added to all the wells, and NGF-7S (100 ng/ml Sigma Aldrich), rhGDNF (50 ng/ml), and rhNT3 (50 ng/ml) were added to half the wells. The cells were incubated at 37° C. in a humid environment with 8% $CO_2$/air for 5 days and the medium changed at 3 days.

Adult Wistar rats were killed by $CO_2$ asphyxiation and DRG from all spinal levels obtained and pooled. DRG were collected in Ham's F12 Nutrient Mix (Invitrogen Life Technologies Ltd, Paisley, UK) and spin-washed three times in fresh Ham's F12. DRG were then transferred into a 1.5 ml eppendorf tube and immersed in 1 ml of 10 U/ml papain solution (Sigma) for 50 min at 37° C. under 5% $CO_2$. The digested tissue was spun, the excess papain removed, and then macerated in trypsin inhibitor solution (Sigma). Rat and human DRG sensory neurons were plated in round cover glass (13 mm diameter) precoated with poly-L-lysine (20 μg/ml) and laminin (10 μg/ml) (both Sigma). Cells were grown for at least 48 h at 37° C. in an atmosphere of 95% air and 5% $CO_2$ in complete BSF2 medium (Ham's F12, bovine serum albumin, apotransferrin, progesterone, insulin, sodium selenite, putrescine, penicillin, streptomycin and 2% (for rat) or 10% (for human) heat-inactivated foetal calf serum) supplemented with neurotrophic growth factors (NGF-7S 100 ng/ml, GDNF 50 ng/ml, hNT3 50 ng/ml) prior to use in the experiments.

Electrophysiology

DRG sensory neurons cultured on coverslips were transferred to the per-fusion chamber (RC-25, Warner Instruments Inc.) and using a separate patch clamp head stage and electrode, standard whole-cell voltage-clamped recordings were performed. Patch electrodes were made from the same glass capillaries as the SICM pipettes to achieve a pipette resistance of 10-16 MΩ. The patch-clamp pipette solution contained 130 mM CsCl, 5 mM NaCl, 5 mM EGTA-Na, and 10 mM HEPES pH 7.3. The bath and SICM pipette solution contained 140 mM NaCl, 5 mM KCl, 2 mM $MgCl_2$, 1.8 mM $CaCl_2$, 10 mM glucose and 10 mM HEPES at pH 7.4. All the inorganic salts and reagents were from Sigma-Aldrich Company Ltd. (Sigma, Gillingham, UK). A holding potential of −60 mV was applied to the patch-clamped cell through the patch electrodes and recordings were sampled continuously at 10 kHz and filtered on line at 2 kHz using an Axopatch 200B patch-clamp amplifier and Clampex-pClamp 9 (Axon Instruments, Burlington, Calif.). The software was used to subtract capacitative and/or linear leak currents. Data were further analysed using Clampfit-pClamp 9 and Origin 5 (Microcal, Northampton, Mass.). All the experiments were performed at room temperature of 23±2° C.

Calcium Imaging

DRG sensory neurons were loaded with fluo-4 acetoxymethyl ester (fluo-4 AM; Molecular probes, Eugene, Oreg.) 4 μM for 1 hour at room temperature. Washing out the remaining fluo-4 was followed by 15 min for de-esterification, before transferring to the perfusion chamber. $Ca^{2+}$ fluctuations were imaged by exciting fluo-4 at 450-480 nm and detecting emitted fluorescence at >520 nm using an intensified CCD (CoolView IDI camera system, Photonic Science, Sussex, UK) coupled to a Nikon TE-2000 inverted microscope and controlled by Image-Pro Plus software (Media Cybernetics, Wokingham, UK). Images were acquired at 2 frames per second with 100 ms individual frame exposure time. Corresponding time traces show normalized intensity fluorescence as the ratio of fluorescence to initial fluorescence ($F/F_0$) in the area of interest.

Results

Figure 3:
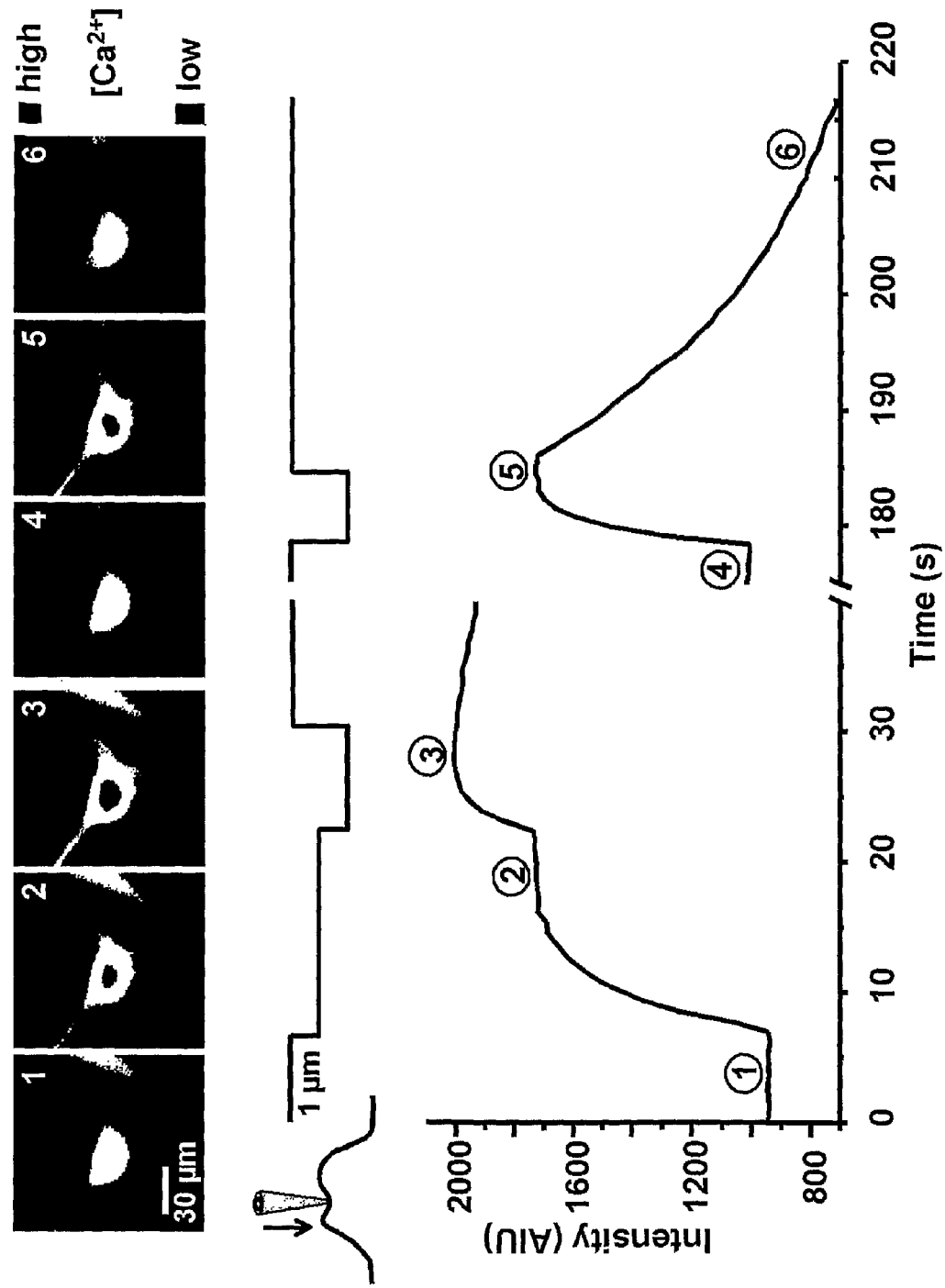
FIG. 3 illustrates the $[Ca^{2+}]$ when the SICM pipette approaches a human DRG neuron.

We used $Ca^{2+}$ imaging experiments to characterise the response of the DRG sensory neurons to mechanical stimulation. First, DRG neurons were stimulated using the contact approach over a small area of the soma (<1 μm²). FIG. 3 shows the result when the SICM pipette approaches the human DRG neuron surface in two 1 μm steps. With the first step, the neuron shows an small increase in $[Ca^{2+}]i$. The fluo-4 fluorescence intensity increases from the basal level (FIG. 3A, frame 1) to that in frame 2. Advancing the pipette 1 μm further, at the peak of the $Ca^{2+}$ response, evokes an additional rise in $[Ca^{2+}]i$ (FIG. 3A, frame 3). The $[Ca^{2+}]i$ returns to basal level after approximately 2 minutes (FIG. 3A, frame 4), when a third stimulus, of 2 μm, again induces a $[Ca^{2+}]i$ rise (FIG. 3A, frame 5). We evaluated the contact approach method on both, human (n=12) and rat (n=24) DRG neurons. However there was a major limitation in using this contact method. The number of successful sequential stimuli in a given experiment was limited. Each time the pipette touches the surface of the cell, it adheres to the membrane and can physically damage the cell; this is evidenced by the fluorophore leaking out of the cell, resulting in a rapid loss of fluorescence (FIG. 3A, frame 6). The contact protocol "damaged" 64±8% of the neurons studied (n=36) by this criterion.

Figure 4:
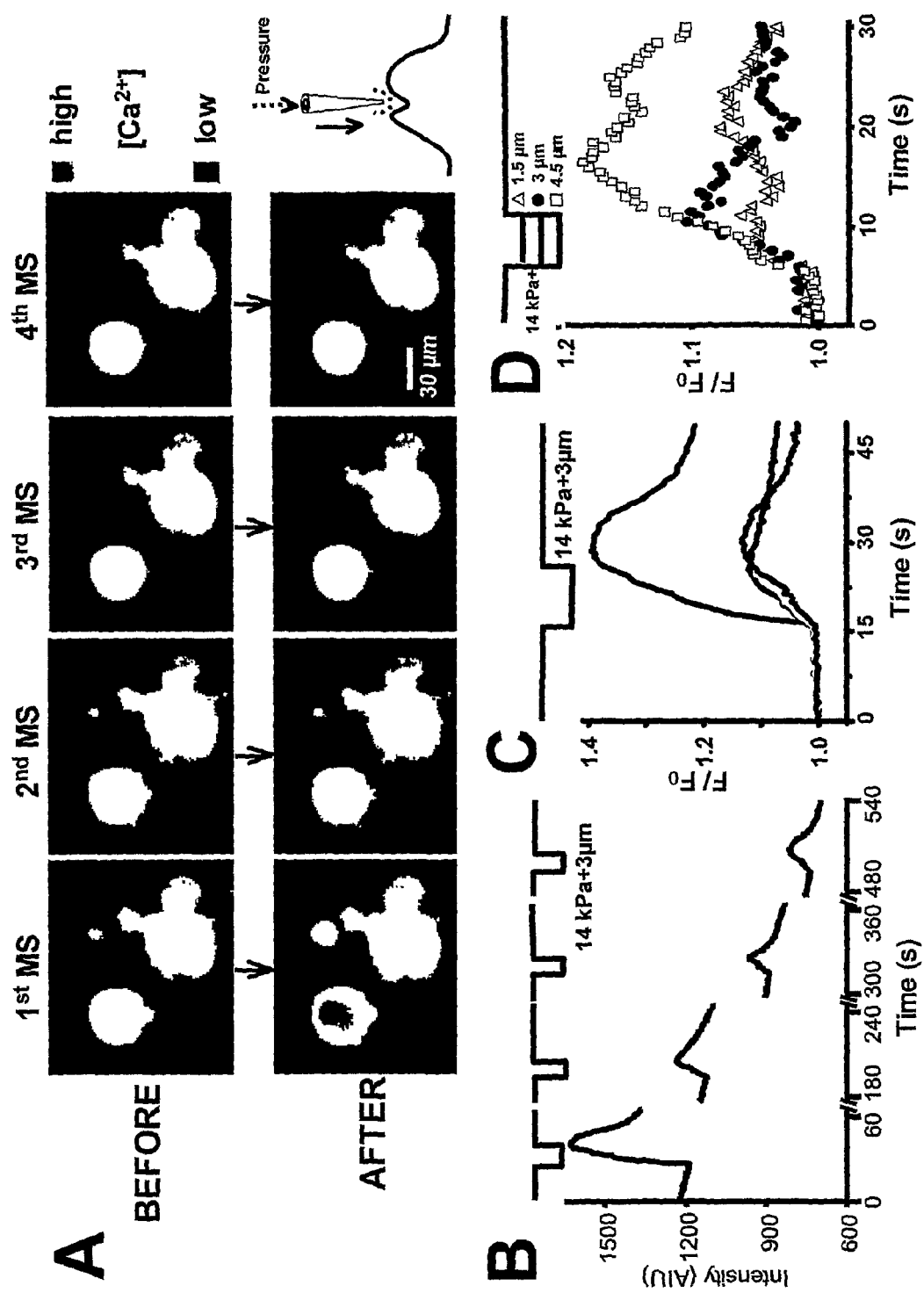
FIG. 4 illustrates the results of sequential mechanical stimulation of NRG neurons using the non-contact approach.

Using the non-contact approach we produced similar responses (human n=8; rat n=32) to those observed with the contact approach, but now the stimulus produced very little damage. Only 2.5±2.5% of the neurons stimulated with the non-contact approach were damaged (n=40) (see FIG. 5C). FIG. 4 shows sequential mechanical stimuli application using the non-contact protocol to a rat DRG neuron, each depressing the cell membrane by 3 μm. Each indentation increased the $[Ca^{2+}]i$ (FIGS. 4B and C). The first stimulus produces a larger $Ca^{2+}$ response compared with subsequent stimuli. The mechanical stimulus delivered is highly localized and does not disturb neighbouring cells (data not shown). FIG. 4D, shows an example of the response of one cell stimulated with three sequential mechanical stimuli of increasing intensity using the non-contact protocol. A graduated increment in the $[Ca^{2+}]i$ is detected.

Figure 5:
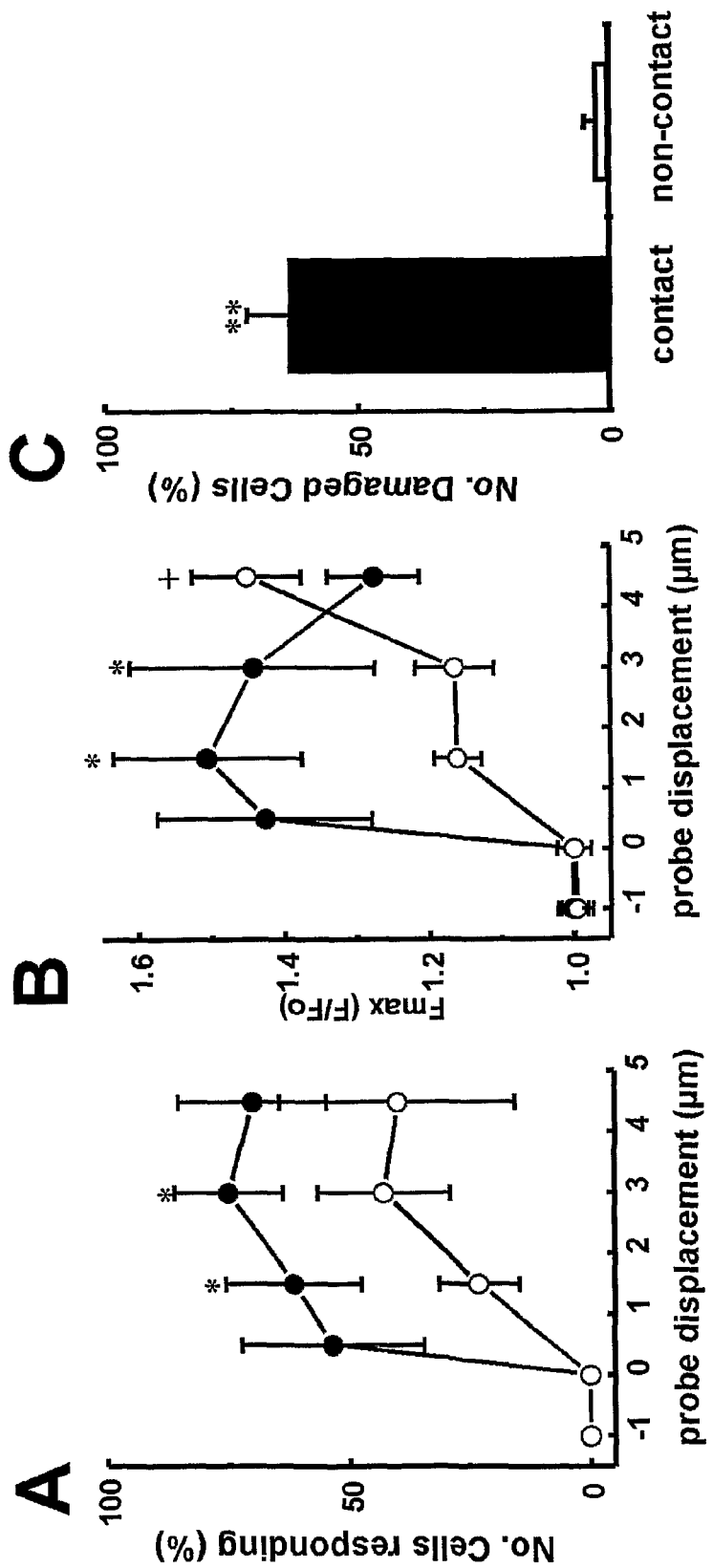
FIG. 5 shows the results of the contact and non-contact approaches to the mechanical stimulation based on $[Ca^{2+}]$.

FIG. 5 compares contact and non-contact approaches. We calculated the percentage of cells that responded with an increment in the $[Ca^{2+}]i$ to MS; the contact approach elicited responses in a significantly greater number of cells than the non-contact approach (FIG. 5A). For example, with a similar stimulation of 3 μm total displacement of the SICM pipette against the cell membrane, 75% of the cells responded to the contact MS (n=16) and only 44% to the non-contact (n=14). In addition, when the contact approach was used, the elevation in the $[Ca^{2+}]i$ was significantly higher than with the non-contact approach (FIG. 5B). However, the contact approach produced a type of all-or-none response, whereas the non-contact approach produced a graded response. The rise in the $[Ca^{2+}]i$ with the contact approach showed little if any relationship to the stimulus intensity, whereas with the non-contact approach, the amplitude of $Ca^{2+}$ response depended on stimulus intensity. Mechanical stimuli producing depressions of 1.5 μm and 3 μm elicited progressively larger $[Ca^{2+}]i$ elevations, with 4.5 μm producing the largest (FIG. 5B).

Figure 6:
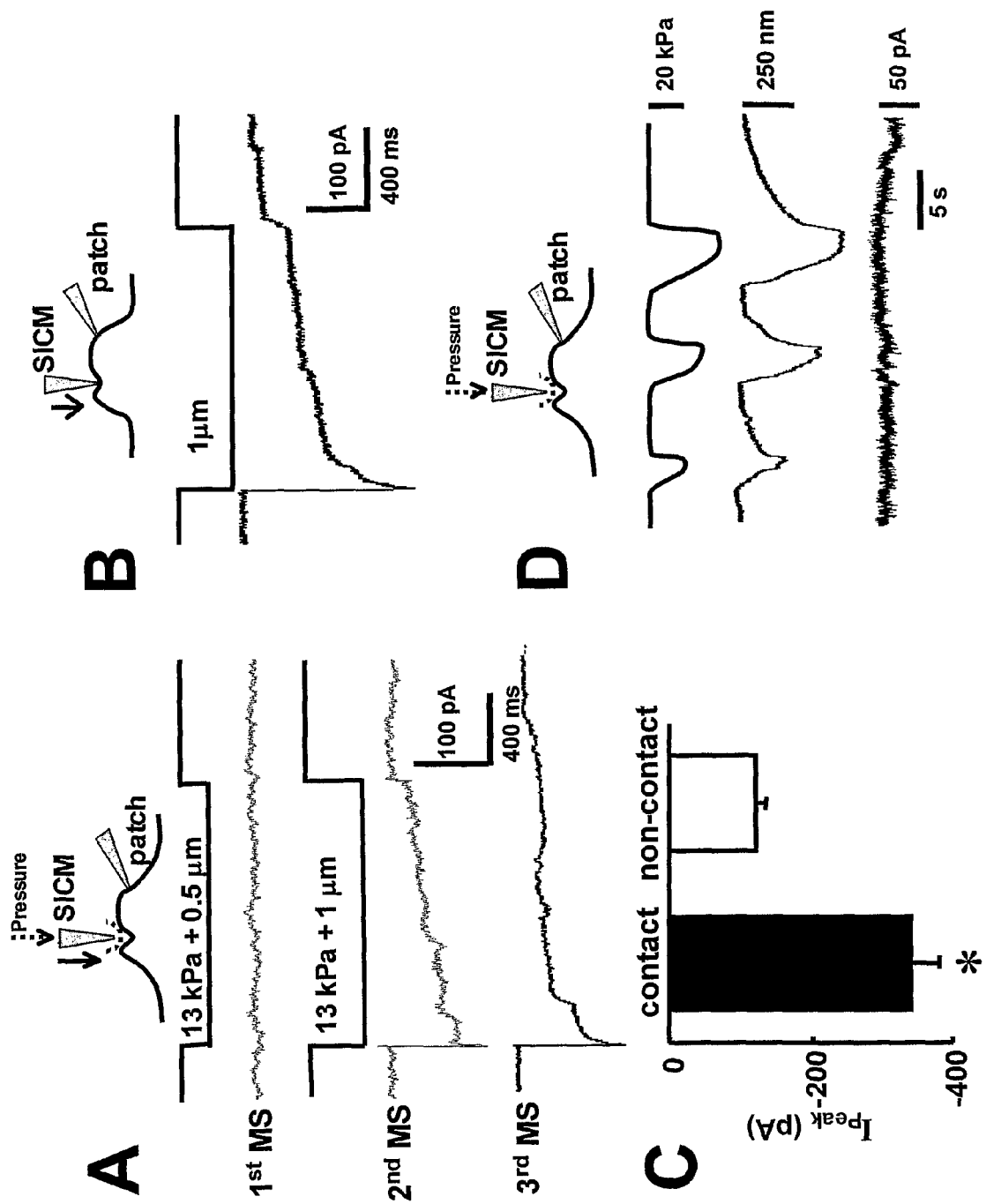
FIG. 6 shows the currents activated by mechanical stimulation of DRG sensory neurons.

We observed whole-cell inward currents activated by mechanical stimuli in DRG sensory neurons cultured from adult rats. When using both the contact and non-contact approach, the mechanical stimulus evoked an inward cationic current with transient and sustained component (FIGS. 6 A and B), as reported in McCarter et al, Neurosci. Lett. 1999, 273:179-82; Drew et al, J. Neurosci 2002, 22:RC228; and Drew et al, J. Physiol. 2004, 556:691-710. The use of the contact approach was of limited use, as the cells were soon damaged, or the patch-clamp pipette moved, breaking the high resistance patch due the direct physical contact, and/or disturbance by the mechanical stimulation. However, non-contact mechanical stimulation could potentially be repeated indefinitely, as there was no physical contact between the SICM probe and the cell, avoiding damage. FIG. 6A shows three sequential mechanical stimuli to a voltage clamped rat DRG neuron using the non-contact approach. The SICM pipette depressed the cell membrane by 1 μm, activating an inward current with transient and sustained component. Similarly, the contact protocol activated a comparable current (FIG. 6B). These results with a 1 μm mechanical stimulation, are concordant with the $[Ca^{2+}]i$ rise shown in FIG. 5B, in that the activated whole-cell peak current (FIG. 6C) with the contact approach is significantly larger (342.7±37.8 pA, n=6) than the non-contact stimulation (122.1±12.4 pA, n=4) for a given sub-maximal mechanical stimulus.

In order to determine if the pressure jet applied during the stimulation using the non-contact approach produced sufficient displacement of the cell membrane to activate mechanosensitive ion channels, we performed control experiments to measure the cell membrane displacement produced by the pressure jet alone. Using up to three time higher pressures than used during the non-contact stimulation, we observed that the membrane moved up to 500 nm but importantly no changes in the whole cell current was detected (FIG. 6D). This means that it is the additional displacement, when pressure is applied and the probe is also moved 1 mm or greater, that produces a larger deformation of the cell membrane and hence activates mechanosensitive channels not pressure alone.

Figure 7:
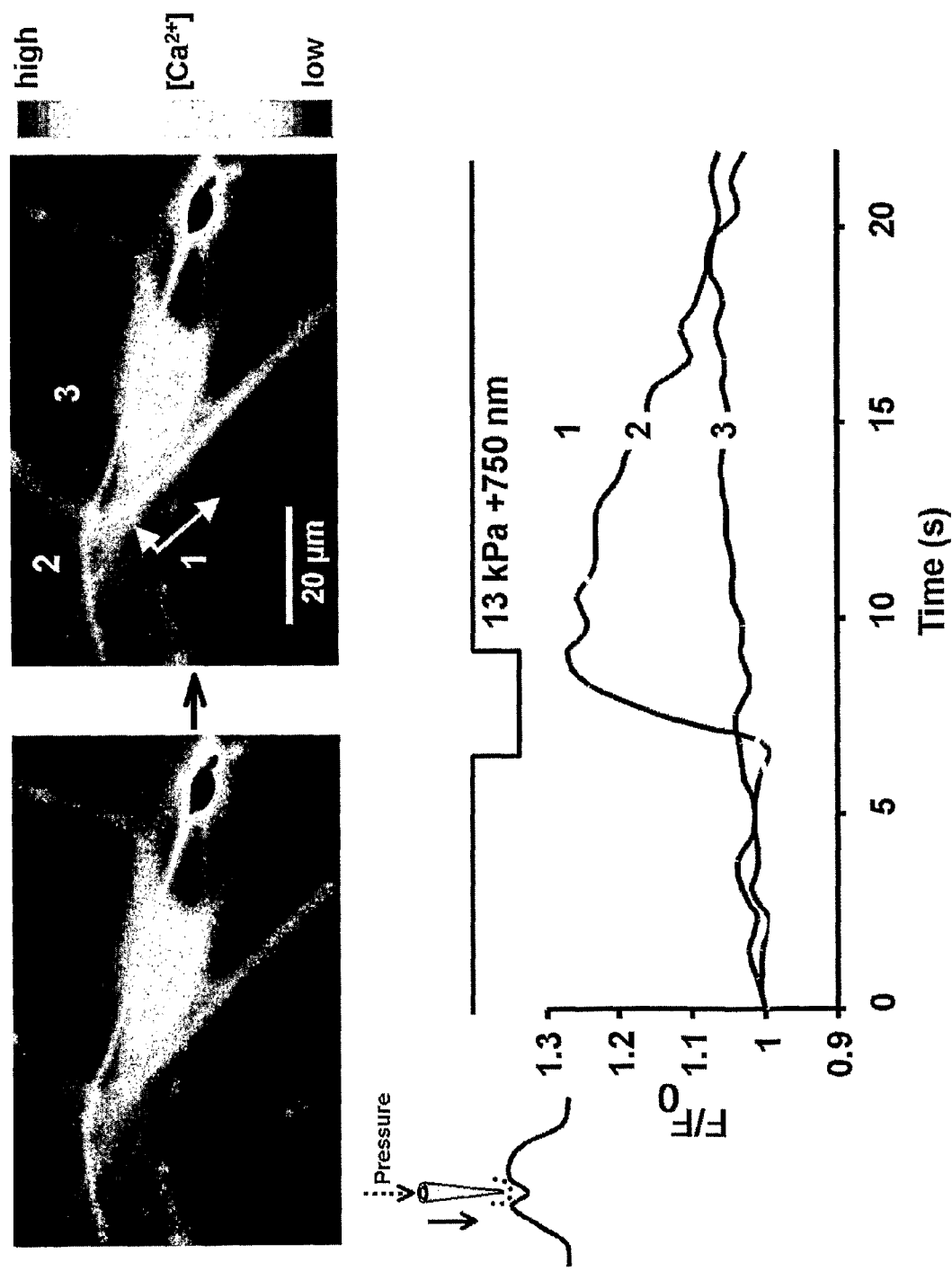
FIG. 7 shows the fluorescence stimuli of NRG sensory neurons generated using the SICM of the invention.

Neurites of human DRG sensory neurons are very fine, down to hundreds of nanometers diameter. They are very difficult to access with the techniques used previously. Here we used the non-contact approach to study their response to mechanical stimulation of dendrites of about 1-2 um diameter. Here we demonstrate the example of the mechanical stimulus was applied at the intersection between two 2 μm diameter dendrites that originated from the convergence of different neurons (FIG. 7, arrow—No. 2). The SICM pipette approached the membrane, simultaneously applying a pressure jet of 13 kPa displacing the surface by 750 nm. The fluorescence intensity increased, propagating away from the point of stimulation along the neurite at 12 μm/s (FIG. 7, arrow—No. 1), whereas in the other neurite (FIG. 7, arrow—No. 3) the fluorescence did not increase.

The content of all publications described above is incorporated herein by reference.

We claim:

1. A method for detecting structural, electrical or mechanical changes on or at a surface by measuring the flexibility or elasticity of the surface using scanning probe microscopy, comprising bringing a scanning probe into proximity with the surface and controlling the position of the probe relative to the surface to maintain a constant distance, characterised in that pressure is applied to the surface by a regulated flow of liquid through the probe, with subsequent monitoring of the position of the probe, wherein movement of the probe indicates a consequent movement of the surface to thereby reveal the changes.

2. The method according to claim 1, wherein positive pressure is applied to the surface.

3. The method according to claim 1, wherein negative pressure is applied to the surface.

4. The method according to claim 1, wherein the probe is a micropipette or nanopipette.

5. The method according to claim 1, wherein the surface is a cellular or subcellular structure.

6. The method according to claim 1, wherein the surface is that of a liquid.

7. The method according to claim 6, wherein the liquid is an emulsion.

8. The method according to claim 1, wherein the surface is of a non-biological structure.

9. The method according to claim 1, wherein the scanning probe microscopy is scanning ion-conductance microscopy.

10. The method according to claim 1, for monitoring electrical or mechanical changes in or at the surface.

11. A method for inducing an electrophysiological or chemical change in a cell, comprising bringing a scanning probe into proximity with the cell surface and applying a defined pressure to the surface by means of a regulated flow of liquid through the probe, and monitoring the cell for changes in electrophysiological or chemical signals.

12. The method according to claim 11, wherein the electrophysiological or chemical signal is associated with an ion channel present on a cell.

13. The method according to claim 11, wherein scanning ion conductance microscopy is used to bring the probe into proximity with the cell.

14. An apparatus for detecting structural, electrical, or mechanical changes on or at a surface, comprising a scanning probe microscope, and a means for applying pressure to the surface by a regulated flow of liquid through the probe.

15. The apparatus according to claim 14, wherein the scanning probe microscope is a scanning ion-conductance microscope.

* * * * *